Oct. 7, 1969    J. E. LINDBERG    3,470,744
TEMPERATURE DETECTION SENSOR
Filed Jan. 14, 1966    3 Sheets-Sheet 1
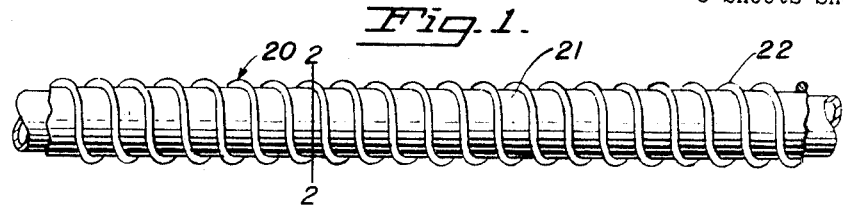
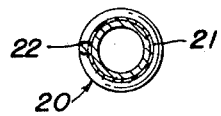 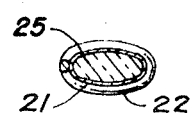 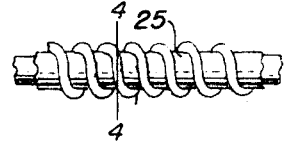
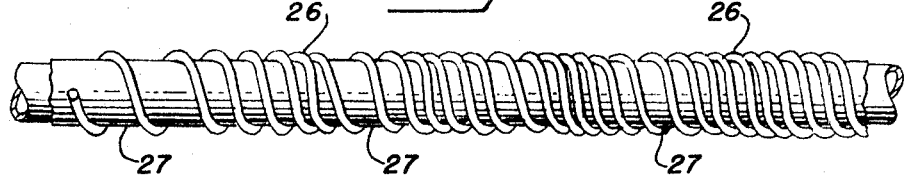
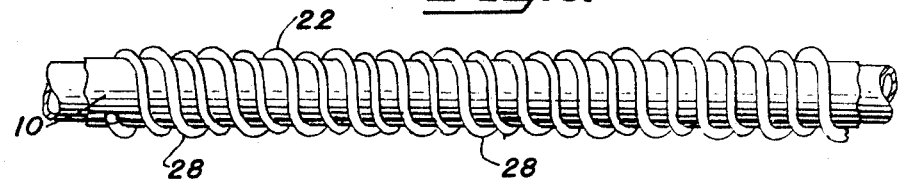
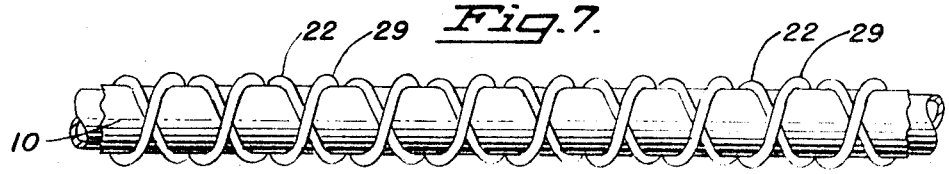
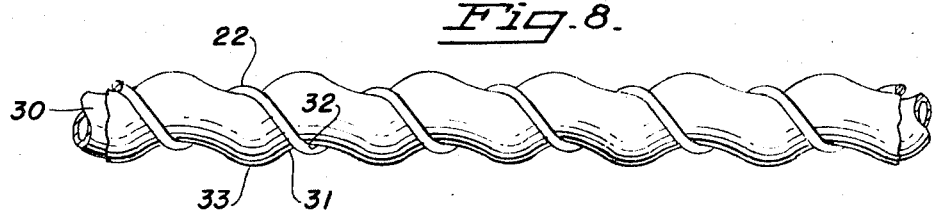
INVENTOR
JOHN E. LINDBERG
BY
Owen, Wickersham & Erickson
ATTORNEYS

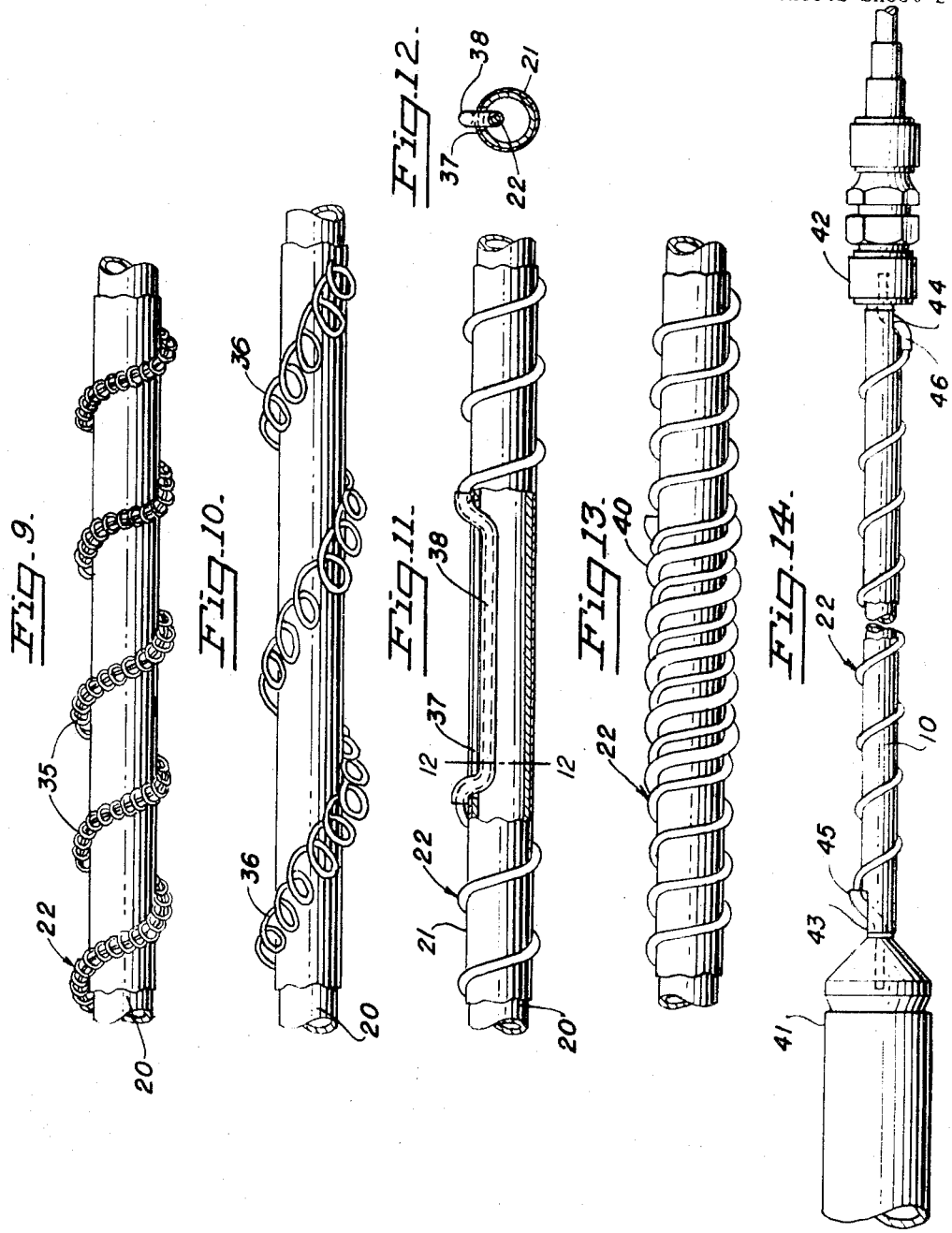

Oct. 7, 1969  J. E. LINDBERG  3,470,744
TEMPERATURE DETECTION SENSOR
Filed Jan. 14, 1966  3 Sheets-Sheet 3
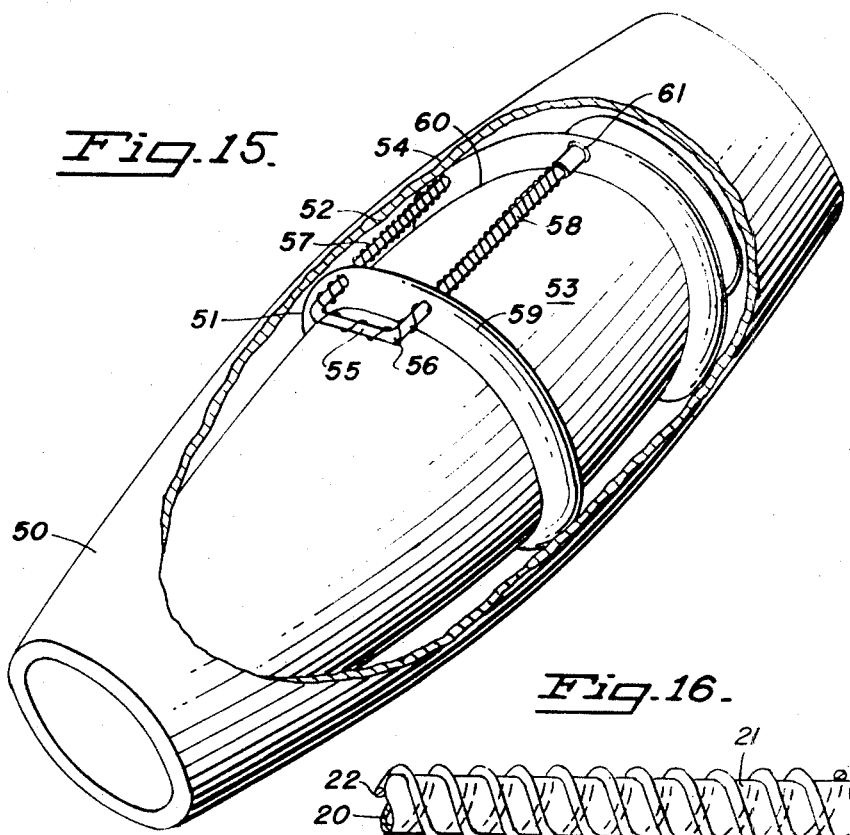
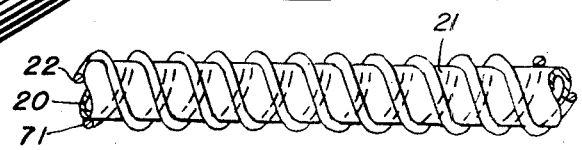
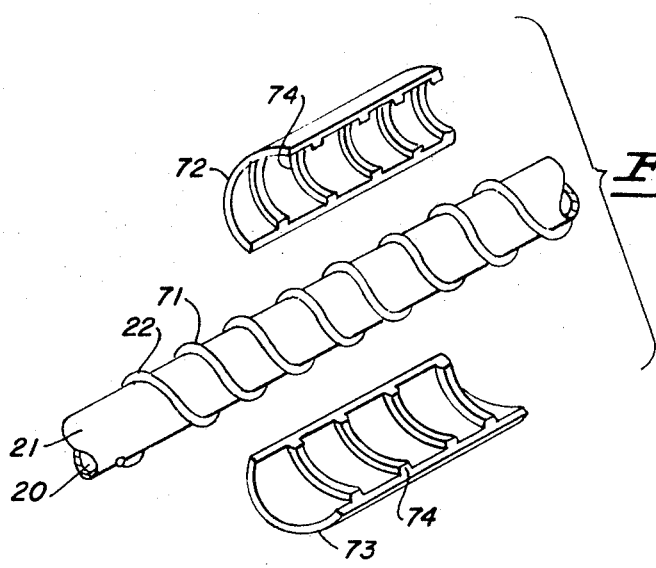
INVENTOR
JOHN E. LINDBERG
BY
Olsen, Wickersham & Erickson
ATTORNEYS United States Patent Office 3,470,744
Patented Oct. 7, 1969

3,470,744
TEMPERATURE DETECTION SENSOR
John E. Lindberg, 1211 Upper Happy Valley Road,
Lafayette, Calif. 94549
Filed Jan. 14, 1966, Ser. No. 520,701
Int. Cl. G01k 5/28
U.S. Cl. 73—368    22 Claims

ABSTRACT OF THE DISCLOSURE

A temperature-detection device wherein an elongated wire-like temperature-sensing member is wound generally helically around and upon an elongated rod-like support member having characteristics of strength, rigidity and vibration resistance suitable for providing the needed support to the sensing member and can be disposed along a desired support path. Preferably, the support member has a heat insulating cover on its outer surface.

---

This invention relates to a continuously supported temperature-detection sensor.

One of the problems in fire-detection systems and other temperature-detection systems heretofore has been to provide adequate support for continuous-type sensors. The sensors themselves are usually somewhat fragile and are preferably small in diameter so that they need some protection, and, of course, they have to be supported, at least at intervals, relative to some main structure. When they have been directly attached to the walls of an aircraft engine nacelle, for example, the vibration has tended to damage them. Special electrical insulation has often had to be provided. Also they have often been exposed to positions where they could be accidentally severed or otherwise damaged.

In one of the best of the support systems heretofore in use, the temperature-detecting sensor was surrounded by a generally tubular perforate shield. Spaced-apart sensor supports were provided at intervals inside the tubular shield and slots and gaps through the shield enabled entry of the heat or flame to be sensed. Though it had many good points, this system had the disadvantage of considerably slowing the time-response of the sensor to a rapid increase in temperature. Such requirements as those of the FAA TSO C11d or the military specification MIL–F–7872B have been difficult to meet because the shield kept heat away from the sensor inside it, as well as shielding it from physical damage. For example, one such requirement is a repsonse time of 5 seconds or less when the complete element (the shield included if there is one) has a six-inch length exposed to a temperature of 2000° F. Another such requirement is a response time of 10 seconds or less at 1500° F. Many prior-art devices have been unable to response within two or three times the prescribed period, and the very best ones (capable of excellent performance if unshielded) have been close to the borderline because of the shielding and support system. Yet without such protection and support, they were subject to damage.

It is also worth noting that the prior-art support and shielding systems were complex and expensive, adding greatly to the cost of the complete system.

One object of the present invention is to provide a supporting structure for a continuous-type temperature detecting sensor which will safeguard it without drastically reducing its response time.

Another object of the invention is to provide essentially continuous support for a temperature-detecting sensor, so that instead of being suported only at spaced intervals and being free to vibrate in between supports, it is supported at substantially all points along its path. As a result, the vibration characteristics, strength, and rigidity of the sensor itself are relatively unimportant compared to the characteristics of the supporting member, which can be made larger and stronger to provide adequate characteristics.

Another object of the invention is to enable disposition of a sensor in such a way that some areas can be given more sensor length to act upon than other areas where the path is of equivalent length. For example, in fire detection there are some critical locations where fires are more likely to break out than others; it is desired to put a larger proportion of the sensor there than in other locations of the same length where fires are less likely to break out; still further, there are some areas where minimum protection is needed, others where maximum protection is needed, and there are varying degrees of response needed in varying locations.

Another object of the present invention is to enable a practically unlimited variation in response weighting and of weighting the average temperature response. Some sensors are capable of arithmetically averaging the temperatures along their path. By providing a path which places more of the sensor per unit path length in some locations than in others, the present invention makes it possible to obtain a weighted arithmetic average along the path where the sensor is disposed. In some instances this is a very desirable feature.

As stated before, one of the problems of the disposition of sensors is to protect them from various accidents. The present invention, while exposing the sensor more directly to its environment still makes it possible to provide protection means for warding off frictional contact and accidental blows.

Other objects and advantages of the invention will appear from the following description of some preferred form of the invention.

In the drawings:

FIG. 1 is a fragmentary enlarged view in elevation of a continuously supported temperature-detection sensor unit of the continuous type, embodying the principles of this invention.

FIG. 2 is a view in section taken along the line 2—2 in FIG. 1.

FIG. 3 is a view similar to FIG. 1 of a modified form of sensor unit embodying the principles of the invention.

FIG. 4 is a view in section taken along the line 4—4 in FIG. 3.

FIG. 5 is a view similar to FIG. 1 of another modified form of sensor unit embodying the invention.

FIG. 6 is a similar view of another modified form of device of the invention.

FIG. 7 is a view similar to FIG. 1 of still another modified form of sensor installation of the invention.

FIG. 8 is a similar view of a further modification of the invention.

FIG. 9 is a similar view of another modified form of the invention.

FIG. 10 is a similar view of yet another modified form of the invention.

FIG. 11 is a fragmentary view in elevation of a sensor unit of the invention showing a portion where the unit is to be clamped to basic supporting structure, such as a wall of an aircraft engine nacelle.

FIG. 12 is a view in section taken along the line 12—12 in FIG. 11.

FIG. 13 is a view similar to FIG. 11 of a modified form of clamping installation.

FIG. 14 is a fragmentary view in elevation of a typical disposition at the ends of a sensor unit of the invention.

FIG. 15 is a view in perspective of a fire detector installation in an engine nacelle, with one unit having two paths within the nacelle connected by a portion outside the fire wall, in an area where only minor warning precautions need be taken.

FIG. 16 is a view similar to FIG. 1 of a device of this invention wherein a plurality of sensors is wound around the same support element.

FIG. 17 is an exploded view in perspective of a device of the invention wherein a modified form of clamping installation is shown.

The present invention is characterized by mounting the elongated wire-like continuous-type sensor around the outside of a larger diameter rod-like supporting structure. Greatly improved performance, as to rapidity of sensor response to heat or flame, is thus obtained, while still obtaining all desired rigidity and strength from the rod-like supporting structure.

In FIGS. 1 and 2, for example, a rod-like support member 20 comprises a hollow stainless steel tube having a heat-insulating coating 21 on its exterior surface. A sensor member 22 of any desired type (whether of the electrical resistance type or of the type disclosed in my U.S. Patent No. 3,195,121, or of some other type) is wound around the coated exterior of the tube 20, being heat-insulated from it by the insulating member 21. The sensing member 22 is, in this instance, wound at a regular helical pitch, so that a true arithmetic average temperature can be obtained, if the sensor 22 itself is capable of arithmetically averaging temperature. The sensor 22 is at all points exposed to direct contact with the surrounding atmosphere; the heat applied to it is kept from being drained into the tube 20 as a heat sink by the insulating coating 21. The sensor 22, being directly supported by the coated tube 20 is virtually independent of its own vibration frequencies, and its own strength and bending charactristics are substantially immaterial. Instead, it is dependent upon the strength, bending and vibration characteristics of the supporting tube 20, which is made of a suitable diameter, shape and material to provide whatever characteristics are desired. The tube 20, may, for example, be stainless steel, to give a relatively low thermal conductivity as well as great strength, relatively low weight and good corrosion resistance. It is preferably larger in diameter than the sensor 22, but may be smaller in certain installations.

As to the coating 21, heat insulation is usually more important than electrical insulation although both may be present. Heat is more important because the more massive support tube 20, being made of metal, tends to provide a heat sink that would conduct heat away from the sensor 22 and therefore would tend to slow the response time of the sensor. Glass tape or ceramic coating may be used as the insulating coating 21, depending upon the application and environment in which the unit is to be installed. Another very good material is high temperature silicone, such as Dow Corning 94–002, which is tough, abrasion resistant, and not appreciably affected by the fluids normally encountered in aircraft environments; being resilient, this silicone material helps to prevent the sensor 22 from chafing against the support tube 20; it also has good thermal (and electrical) insulating properties. By substantially isolating the sensor 22 from the support tube 20, very rapid response time can be obtained. Being a good electrical insulating material, this material and some others enable the use of the sensor 22 as an electrical conductor as shown in my U.S. Patent No. 3,237,179 (application Ser. No. 126,437) where it is desired to test the sensor for continuity and for integrity by passing an electrical current through it to detect the absence of breaks or to heat the sensor 12 to an alarm temperature where the sensor actuates an alarm device under these test conditions. Thus, the support structure has great versatility and enables the use of such types of sensors and sensor tests. The resilient coating 21 for the support tube 20 helps to act as an energy absorber for slight relative motion between the sensor 22 and the support tube 20, especially during vibration conditions. As a result the sensor 22 has substantially no resonance characteristics of its own, because it is continuously supported and the only resonance characteristics that are concerned are those of the support structure.

Additional electrical insulation may be obtained by coating the tube 20, sensor 22 or the entire assembly with an insulating material such as glass fiber tubes or, for example, the one known as Pyre ML, or ceramic materials, of woven nylon (such as Nomex), or other high-temperature plastics.

Other metals and non-metals may be used for the support member, as illustrated in FIGS. 3 and 4 along with certain other features. Here is a rod-like non-metallic insulating support member 25 made of glass fibers or high temperature plastic, so that it requires no insulating coating. The member 25 is shown as solid with an oval shape (in cross section) to give a different type of distribution of the sensor 22, particularly adaptable where the heat comes from only two directly opposite directions and where small attention has to be paid to other directions. The sensor 22 is again wound around in a regular helix. It may be noted at this point, that a metal support tube may be made oval or teardrop shape or square in cross section, or in other shapes, that a solid support member may be made from metal, and that a tube may be made from an insulating non-metal. Men skilled in the art who have read this will know within a wide range what materials would be best for which purposes.

The round shape of the tube 20 of FIGS. 1 and 2 is non-directional in its response and is generally preferred, especially since the round tubing gives the best strength-weight ratio and is excellent in resisting vibrations, bending and torsional forces. However, in unidirectional application, a flatter shape like that of the member 25 may be used, and in applications where perpendiculars are concerned a square shape may be used.

Due to the helical form of the sensor 22, a bending of the support member 20 produces a torsional force on the sensor 22, and actual displacement in torsion per unit length is very small. Therefore, the fatigue life of the sensor is almost unlimited.

In many instances the preferred sensor 22 is that of my Patent 3,195,121 where a metal or non-metal tube is filled with an inert gas such as argon and also contains a discrete response member, such as a metallic hydride wire. An arithmetical average is then obtained by averaging the argon gas pressure, which the sensor does automatically when used in connection with a suitable pressure-responding device such as that shown in my U.S. Patent No. 3,180,956. The devices shown in FIGS. 1 through 4 then give an average that is truly arithmetical.

In some instances, it is desired that the average be weighted. In other words, it is desired to place more emphasis on certain portions of the path than on others. One structure capable of providing a weighted average is shown in FIG. 5. Here, the sensor 22 is still wound helically around the coated support tube 20, but the pitch is varied, being reduced at some places 26, so that the successive turns then are much closer together than at other places 27 where the sensor is more spread out, so that less sensor length is available for response at 27 than at 26. By this means any desired weighting can be obtained, whether determined by a mathematical curve or simply by empirical data.

It is often desirabe to protect the sensor from contact with other objects. Such contact might result in abrasion of the sensor surface or it might result in blows which would affect it or even sever it. One way of protecting the sensor 22 is shown in FIG. 6 where a strand 28 of suitable protecting material is wound around the coated support tube 10 in between the turns of the sensor 22. The protecting strand 28 may be a large diameter metal wire or may be an insulating strand able to withstand the heat involved. Since the wire or strand 28 is larger in diameter than the sensor 22, the first contact by one object is made with the wire or strand 28, and contact with the sensor 22 is warded off.

The structure of FIG. 6 may be modified by winding an insulated wire over the entire unit, or the structure of FIG. 7 may be used in which a protecting strand 29 is wound in the opposite direction from the sensor 22 and crosses over the sensor 22 at each place where the two meet. Thus, if the sensor 20 is wound as a right-hand helix, the counterwrap 29 may be wound as a left-hand helix with the pitch preferably approximately the same as for the sensor 22, although it may be different if that is desired. When such wires 29 cross over the sensor 22 or whenever the sensor 22 is wound around a metal tube 10 care must be taken to provide adequate heat insulation.

Another way of protecting the sensor 22 from direct blows is shown in FIG. 8 where a support tube 30 is provided with a helical groove 31, preferably broad and shallow but deeper than the diameter of the sensor 22, so that when the sensor 22 is wound into the bottom 32 of the groove 31, the high points 33 of the suport tube 30 provide abrasion protection without any contact of the sensor 22. In this instance, the pitch of the groove 31 controls the spacing of the sensor turns, and this groove 31 can be made regular or irregular as is desired. The support tube 30, if heat conducting, is provided with a coating like the coating 21.

Another way of protecting the sensor 22 is shown in FIG. 9, where a small diameter protecting wire 35 is wrapped helically around the sensor 22. The wire 35 is open-wound to give a minimum of interference with the response time of the sensor. The wrapped sensor 22 is then wound around its support tube 20 as before, and the small wire 35 helps to prevent contact; it is particularly effective against abrasion. The wire wrap 35 may be separately coated with silicone or other insulating material to provide additional resilience and anti-abrasion properties.

FIG. 10 shows a further way of winding a sensor 36 onto a support member 20, in which a sensor like the sensor 22 is coiled onto itself in a tight helix and is then pulled open and spaced from itself to permit entry of hot gases. The diameter of the helix 36 should be substantially smaller than the diameter of the support member 20 for best results. This helix 36 is then wound helically around the support member 20, at either a regular or an irregular pitch. This structure provides another way of increasing the length of sensor which is exposed to a given length of path, i.e., weighting. It is also possible to use coiling for only part of the sensor, in place of having an irregular pitch, and then to have the remainder of the sensor wound as in FIG. 1. This again illustrates the versatility of the present invention.

The support tube on the unit itself may be secured to aircraft or other structure by suitable clamps. At the clamping location it is often desirable to prevent contact between the clamps and the sensor. One way of doing this is shown in FIGS. 11 and 12. Here the sensor 22 is wound helically around the support tube 20 as in FIG. 1 or as in FIG. 5, and at the locations where there is to be clamping, the support tube 20 is provided with a groove or slot 37 or larger width than the diameter of the sensor 22. In a solid support tube, the groove 37 may be milled out, and in a metal tube, the groove 37 may be formed by folding in the tubing wall instead of actually removing a portion. At these places the sensor 22 is preferably covered with a suitable insulation such as a sleeve 38, such as Nomex, a braided sleeving made from specially treated nylon or a sleeve made from glass fibers. The sleeved sensor is then made to enter the slot or groove 37 at one end thereof, travel inside the tube 20 to the other end of the slot or groove 37 and then to emerge. The sleeve 38 is preferably a little longer than the groove or slot 37, which is in turn longer than the width of the mounting clamp. This means that a clamp can engage around the circumference of the tube 20 to give full support to the support tube 20 while not touching the sensor 22 at all. Clamps, of course, may be used around the entire assembly and can bear directly upon the sensor 22 or upon the largest diameter of the assembly such as the wire 29 in FIG. 7.

Another way of providing for the clamping is shown in FIG. 13 in which a high temperature plastic, glass fiber, or asbestos strand 40 is wound in a helix parallel to the sensor helix, at the clamping areas only; the mounting clamp can then bear upon that helix 40, which is of larger diameter than the sensor 22, so that the clamp does not touch the sensor 22.

FIG. 14 shows terminal ends of the sensor unit. At one end, thne sensonr 22 is to be permanently attached to a responder unit 41 such as that shown in my U.S. patent No. 3,180,956; at the other end the sensor 22 is to be attached to a tail connector 42 such as shown in my U.S. patent No. 3,196,423. In both instances, this may be accomplished by providing slots, grooves or other types of openings 43 and 44 (as in the groove 37) in the support tube 10 and by using suitable abrasion-protecting insulating sleeves 45, 46 to enable the sensor 22 to enter the slots 43, 44 and pass into the interior of the tube 10. In this instance (unlike that of FIG. 11) the sensor 22 does not re-emerge but is routed into the responder housing 31 at one end and is permanently attached to the responder there, while at the other end it is permanently attached to the electrical contact of the tail connector 42. At both locations the sensor 22 is insulated both thermally and electrically from the surrounding support structure 10.

FIG. 15 is a somewhat simplified cutaway view of an engine nacelle 50 wherein a sensor unit 51 is mounted in the air space 52 between the engine 53 and the cowling 54. The sensor unit 51 comprises a generally U-shaped support member 55 (like the coated member 10) on which a sensor 56 (like the sensor 22) is helically wound. Both arms 57 and 58, the support member 55, and the sensor 56 pass through a fire seal 59 across the top of the engine 53 and back through the fire seal 59 to give two passes across the nacelle 50. A responder 60 and a tail connection 61 can be seen. The pitch of the sensor 56 is greatly increased as it passes through the non-critical area behind the fire seal 59, while it has a short pitch in the critical fire areas.

FIG. 16 shows a support tube 20 with coating 21, as in FIG. 1, with two sensors 22 and 71 wound helically therearound. The sensors 22 and 71 may be identical, for redundancy of equipment, or may have different temperature set points, or one may be averaging only and the other discrete only, or any of the combinations desired. More than two sensors may be used on the same support member. A great number of useful combinations thus become possible.

FIG. 17 shows an alternative way of clamping around the sensor-support structure of FIG. 1. Here a clamp guard 71 is made from two halves 72 and 73, each of which has an internal helical thread 74 which engages the wall of the support tube in between the turns of the helical sensor 22. The thread 74 is higher than the sensor diameter and so it spaces the clamp guard 71 away from the sensor 22. Thus, the clamp guard 71 is like a split nut; it may be made from plastic, and it may provide a quick-opening device, also enabling rapid mounting.

Tests made upon units embodying this invention may be of interest. In one such test, two lengths of stainless steel tubing approximately one foot long were selected; one tube being 1/4 inch in diameter and the other 3/16 inch in diameter. Both tubes were coated with silicone (Dow Corning 94–002). A portion of an elongated sensor was then wound on each tube so as to be tight against the coating, and in both instances a winding pitch of 1/4 inch was used between successive turns. The structure looked like that of FIG. 1.

Each sample was tested for response time by placing a six-inch portion of the sensor and support in the flame of a standard burner adjusted to 2000° F. Both samples were tested several times and were allowed to cool between tests. The sensor wound around the ¼ inch tube had an average response time of 2.0 seconds while that on the ³⁄₁₆ inch tube was 3.2 seconds. A similar sample constructed on a small molybdenum rod 0.080 inch in diameter with a sensor pitch of approximately 0.080 inch gave a response time of 3.5 seconds. All of these are well within the response time of 5.0 seconds called for by FAA TSOC11$d$ or military specification MIL–F–7872B. It was also noticeable, however, that the larger diameter support tube was superior to the smaller tube in response time. However, in some installations small-diameter rods may be essential, as where it is necessary to bend the support member in the field, in order to accomplish a difficult installation. The support members may be as small as about 0.010 inch in diameter.

Another sensor of the same type when supported inside a tubular shield with large slots had a response time of 5.0 seconds in the structure's shadow area, which is the less favorable direction, whereas the sensor of this invention was uniformly responsive in all directions. Still other types of sensors, when mounted in armour type structures, had response times of 10 to 15 seconds and longer and so failed to meet the requirements of the FAA TSO C11$d$ or MIL–F–7872$b$.

An additional requirement of MIL–F–7872$b$ is a response time of 10 seconds or less in a 1500° F. flame. When tests were made on the units of this invention according to these specifications, the response time for the ³⁄₁₆ inch tube was 10.1 seconds and the time for the ¼ inch tube was 7.5 seconds. The ³⁄₁₆ inch tube came very close to meeting the requirement, and its sensitivity can be increased by reducing the winding pitch of the sensor to expose more sensor to the flame. The ¼ inch tube even at this distance did meet the specification exactly and with a margin to spare.

Vibration tests were also performed, using conditions much more stringent than the requirements of FAA TSO C11$d$ and MIL–F–7872$b$. The samples were vibrated for 100 hours with no failures. In similar tests on shielded sensors of the prior art, the shields failed after the mounting clamp failed in from seven to fifteen hours. The mounting clamps in both instances were identical standard ones, and stronger and better ones can be made.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A temperature detection device, including in combination:
    an elongated rod-like support member having characteristics of strength, rigidity, and vibration resistance suitable for said device, said support member being disposed along a desired support path, and
    an elongated wire-like temperature sensing member wound generally helically around said support member and supported thereby,
    said support member having a helical groove on its outer surface that is deeper than the diameter of said sensing member, said sensing member being disposed in said groove and thereby afforded protection from contact by members that touch the outer surface of said support member.

2. A temperature-detection device, including in combination:
    an elongated rod-like support member having characteristics of strength, rigidity, and vibration resistance suitable for said device, said support member being disposed along a desired support path, and
    an elongated wire-like temperature sensing member wound generally helically around said support member and supported thereby,
    said sensing member being wound along a helical path of irregular pitch, being bunched in some parts and widely spaced in others, thereby accentuating response along some portions of its path relative to other portions of said path.

3. A temperature-detection device, including in combination:
    an elongated rod-like support member having characteristics of strength, rigidity, and vibration resistance suitable for said device, said support member being disposed along a desired support path,
    an elongated wire-like temperature sensing member wound generally helically around said support member and supported thereby, and
    a generally helical winding of a protective strand larger in diameter than said sensing member wound around said support member and disposed approximately midway between the successive turns of said sensing member, for protection of said sensing member from contact with other objects.

4. A temperature-detection device, including in combination:
    an elongated rod-like support member having characteristics of strength, rigidity, and vibration resistance suitable for said device, said support member being disposed along a desired support path,
    an elongated wire-like temperature-sensing member wound generally helically around and upon said support member and supported thereby at substantially all points along its length while fully exposed to the atmosphere all along said path, and
    a generally helical winding of a protective strand wound around said support member in the opposite direction from that in which said sensing member is covered and passing over said sensing member at the crossings thereof.

5. A temperature-detection device, including in combination:
    an elongated rod-like support member having characteristics of strength, rigidity, and vibration resistance suitable for said device, said support member being disposed along a desired support path,
    an elongated wire-like temperature sensing member wound generally helically around said support member and supported thereby, and
    wire smaller in diameter than said sensing member helically wound around said sensing member.

6. A temperature-detection device, including in combination:
    an elongated rod-like support member having characteristics of strength, rigidity, and vibration resistance suitable for said device, said support member being disposed along a desired support path, and
    an elongated wire-like temperature-sensing member wound generally helically around and upon said support member and supported thereby at substantially all points along its length while substantially fully exposed to the atmosphere all along said path,
    said sensing member being helically coiled on itself and thus wound around said support member.

7. A temperature detection device, including in combination:
    an elongated metal support element disposed along a desired support path,
    a heat insulating cover on the outer surface of said element, and
    an elongated wire-like temperature sensing member wound around and in direct contact with said cover along a generally helical path, and otherwise generally exposed directly to the atmosphere around said path, whereby said element provides the support strength, rigidity, and vibration resistance for the device without acting as a barrier between said sensing member and the atmosphere around the device.

8. The device of claim 7 wherein said sensing member comprises a device capable of measuring the arithmetic average temperature over its length.

9. The device of claim 8 wherein said sensing member describes a regular helix with constant pitch to give arithmetical average temperature response by its internal gas pressure.

10. The device of claim 8 wherein said sensing member describes a generally helical path of varying pitch, the successive turns being closer together at some locations than at others so as to give a weighted average of temperatures along said path, as sensed by the average gas pressure within said sensing member.

11. The device of claim 7 wherein said sensing member contains means for indicating attainment of a predetermined high temperature at any discrete portion thereof.

12. The device of claim 7 wherein said sensing member comprises a device capable of both arithmetically averaging the temperature along its length and of indicating a predetermined higher temperature at any discrete portion thereof.

13. The device of claim 7 wherein said element has, at selected intervals, a series of longitudinally extending openings, said sensor at such openings being provided with an insulating coating and passing below the outer surface of said tube at one end of said opening and out therefrom at the other end, whereby said support element can be clamped around its circumference at said slots without clamping against said sensing member.

14. The device of claim 7 wherein at intervals an insulating strand larger in diameter than said sensing member is wound along in the same direction as said sensing member between its adjacent turns, so that clamps can be applied around said element in contact only with said strands.

15. The device of claim 7 wherein at extremities of said support element, said sensing means is below the outer surface of said support element for terminal connections.

16. A temperature-detection device, including in combination:
an elongated rod-like support member having characteristics of strength, rigidity, and vibration resistance suitable for said device, said support member being disposed along a desired support path,
an elongated wire-like temperature sensing member wound generally helically around said support member and supported thereby, and a split sleeve having internal threads of greater radial extend than said sensing member is placed around said support member in contact therewith and spaced from said sensing member, to afford an attachment medium for a clamp.

17. A temperature detection device, including in combination:
an elongated metal support tube disposed along a desired support path,
a heat insulating cover on the outer surface of said tube, and
an elongated wire-like temperature sensing member wound around said cover along a generally helical path,
whereby said tube provides the support strength, rigidity, and vibration resistance for the device.

18. The device of claim 17 wherein said sensing member comprises a metal tube containing gas for temperature averaging and containing means for indicating attainment of a predetermined high temperature at any discrete portion thereof.

19. The device of claim 18 wherein said sensing member describes a regular helix with constant pitch to give arithmetical average temperature response by its internal gas pressure.

20. The device of claim 18 wherein said sensing member describes a generally helical path of varying pitch, the successive turns being closer together at some locations than at others so as to give a weighted average of temperatures along said path, as sensed by the average gas pressure within said sensing member.

21. The device of claim 17 wherein said tube has, at selected intervals, a series of longitudinally extending slots, said sensor at such slots being provided with an insulating coating and passing into said tube at one end of said slot and out therefrom at the other end, whereby said support tube can be clamped around its circumference at said slots without clamping against said sensing member.

22. The device of claim 17 wherein at extremities of said support member, said sensing means is led inside said support member for terminal connections.

References Cited
UNITED STATES PATENTS

| | | | |
|---|---|---|---|
| 2,456,617 | 12/1948 | Burch | 73—295 |
| 3,302,458 | 2/1967 | Scadron | 73—295 |
| 2,015,851 | 11/1935 | Herrick et al. | 73—343.5 |

FOREIGN PATENTS

| | | |
|---|---|---|
| 251,291 | 7/1926 | Great Britain. |

LOUIS R. PRINCE, Primary Examiner

WILLIAM A. HENRY II, Assistant Examiner